United States Patent

Larsen

Patent Number: 5,935,632
Date of Patent: Aug. 10, 1999

[54] METHOD FOR PRODUCING CONSUMER MILK WITH GOOD KEEPING QUALITIES

[75] Inventor: Peter H. Larsen, Aarhus, Denmark

[73] Assignee: Tetra Laval Holdings & Finance S.A., Pully, Switzerland

[21] Appl. No.: 08/945,859

[22] PCT Filed: Jul. 17, 1995

[86] PCT No.: PCT/SE95/00864

§ 371 Date: Jan. 16, 1998

§ 102(e) Date: Jan. 16, 1998

[87] PCT Pub. No.: WO96/36238

PCT Pub. Date: Nov. 21, 1996

[30] Foreign Application Priority Data

May 17, 1995 [SE] Sweden ................................. 9501822

[51] Int. Cl.⁶ .................................................... A23C 3/00
[52] U.S. Cl. ............................ 426/522; 99/452; 426/491
[58] Field of Search .................................... 426/522, 491, 426/495; 99/452

[56] References Cited

U.S. PATENT DOCUMENTS

| | | | |
|---|---|---|---|
| 3,233,964 | 2/1966 | Skoldberg | 422/128 |
| 3,973,048 | 8/1976 | Sollerud | 426/522 |
| 4,515,823 | 5/1985 | Kirschenmann | 426/522 |
| 4,560,567 | 12/1985 | Rausing | 426/399 |
| 4,853,246 | 8/1989 | Stevens | 426/580 |
| 4,876,100 | 10/1989 | Holm et al. | 426/522 |
| 4,894,243 | 1/1990 | Ahrné | 426/580 |
| 5,401,523 | 3/1995 | Degen et al. | 426/491 |

FOREIGN PATENT DOCUMENTS

| | | |
|---|---|---|
| 67105081-3 | 10/1967 | Sweden . |
| WO 94/26121 | 11/1994 | WIPO . |

Primary Examiner—George Yeung
Attorney, Agent, or Firm—Burns, Doane, Swecker & Mathis, L.L.P.

[57] ABSTRACT

A method for continuous production of consumer milk with a variable fat content including microfiltration of a flow of skim milk. From the microfilter there is obtained a retentate flow and a permeate flow. The permeate flow of skim milk is subjected to a heat treatment and is then mixed with a partial flow of high temperature treated cream product in a desired amount. From this, there is obtained consumer milk with a good keeping quality.

5 Claims, 1 Drawing Sheet

METHOD FOR PRODUCING CONSUMER MILK WITH GOOD KEEPING QUALITIES

TECHNICAL FIELD

The present invention relates to a method for producing consumer milk with good keeping qualities.

BACKGROUND OF THE INVENTION

In order to secure that milk that is delivered to the consumers does not contain pathogenic microorganisms the milk is heat treated prior to the packaging. This heat treatment may be carried through at different time/-temperature combinations. Usual standards within this field are low pasteurization, high pasteurization and ultra pasteurization. Depending on the legislation in different countries the pasteurizing processes are different. As example of different processes there may be mentioned low pasteurization where the milk is heated to a temperature of 63–65° C. and is kept at this temperature during 30 minutes or to 72–75° C. with a holding time of 12–40 seconds. When high pasteurizing the treatment may comprise heating to 80–100° C. during 10–20 seconds and at ultra pasteurization 110–125° C. for 0.5–4 seconds.

A more forceful heat treatment gives a more complete killing of both pathogenic as other microorganisms present in the milk. The stronger the heat treatment the more pronounced is the effect on the chemical constituents, proteins, enzymes and vitamines in the milk which effect may be sensed as an impairment of the taste.

The shelf life of the packaged milk depends of course also on the treatment after the pasteurization step. It is extremely important to hinder reinfection during the process steps prior to the packaging in order to obtain good keeping qualities.

In order to obtain a milk product with a good keeping quality and a good taste one balances between the desire to achieve a product with as good bacteriological quality as possible, which product at the same time has not been effected negatively by the necessary heat treatment.

One way of obtaining a milk product with an extended shelf life is described in SE 451 791. According to this patent milk is divided into a cream and a skim milk fraction by means of centrifugal separation. The skim milk fraction is led to a microfilter and is divided into a permeate with a low bacteria content and a concentrate with a higher fat content than the permeate in the microfilter. The cream fraction and the concentrate are sterilized and remixed in desired proportions with the permeate after which the mixture passes a final heat treatment. The milk obtained according to the patent which is bacteria-poor may for example be used for producing cheese or be sold as consumer milk with extended shell life.

SUMMARY OF THE INVENTION

According to the invention there is now proposed a method of continuously producing a consumer milk with good keeping qualities where no part of the milk flow has been subjected to more than one heat treatment. In many countries the legislation forbids more than one heat treatment. According to the method of the invention a flow of skim milk is brought to pass a microfilter from which there is obtained a retentate flow and a permeate flow. The obtained permeate flow is subjected to a heat treatment and is then remixed with a partial flow of high temperature treated cream product in a desired amount in order to give a consumer milk with a long shelf life.

DETAILED DESCRIPTION OF THE INVENTION

Figure 1:
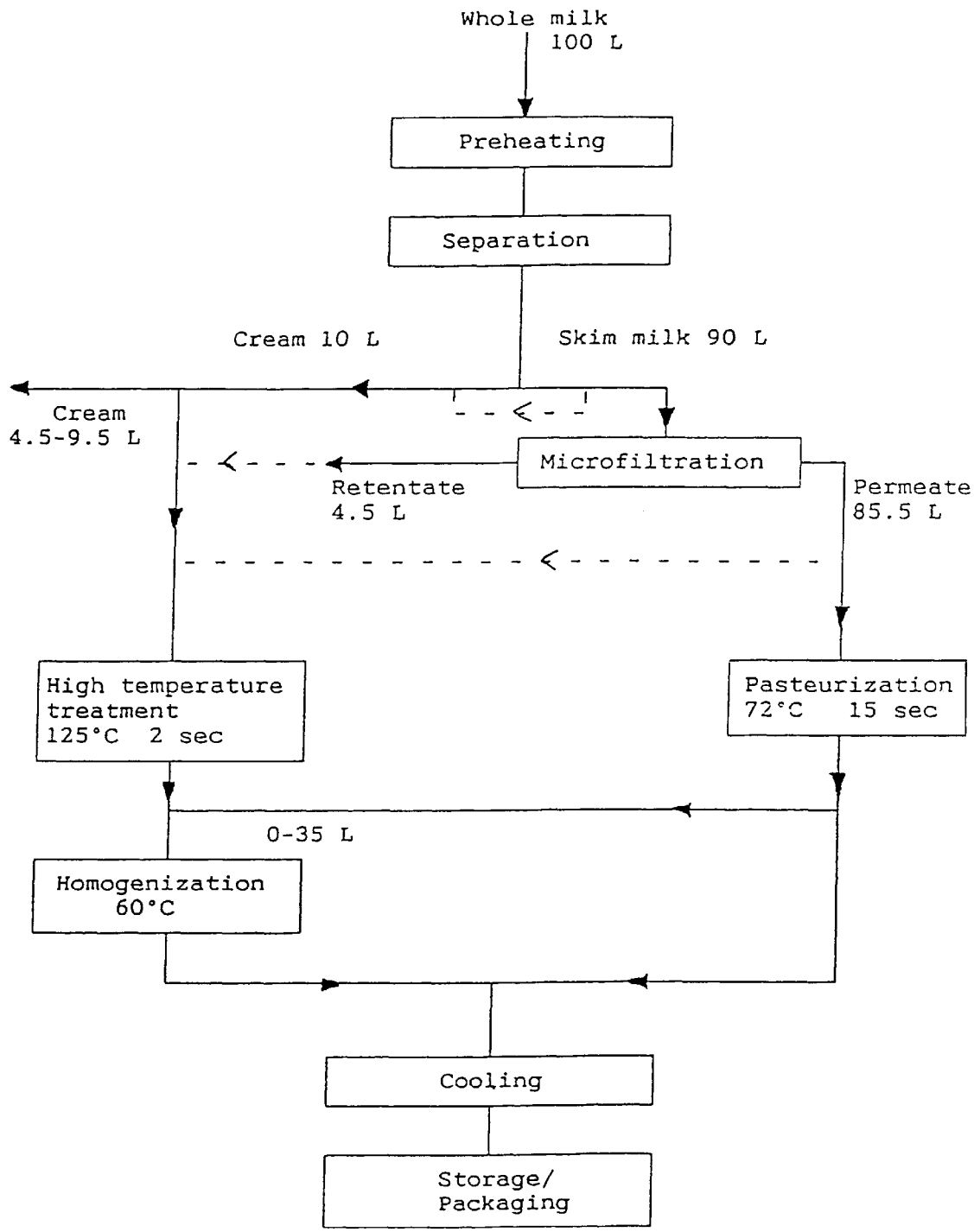
FIG. 1 illustrates a flow chart of a method of producing pasteurized consumer milk according to the present invention.

The method of the present invention comprises the steps of separating whole milk into a fraction of cream and a fraction of skim milk, passing a flow of the fraction of skim milk through a microfilter to obtain a flow of retentate and a flow of permeate, treating a flow of the cream fraction at a high temperature of at least 110° C. for a predetermined time period sufficient to sterilize the cream fraction, remixing the high temperature-treated flow of cream with the permeate flow to form the consumer milk, and pasteurizing the permeate flow prior to remixing with the high temperature-treated cream flow. The flow of separated cream and the permeate flow are subjected to not more than one high temperature treatment and not more than one pasteurizing step, respectively.

In the patent application the expression cream product is used. Some twenty years ago there was on the market mainly two different kinds of cream, namely whipping cream with a fat content of 35–40% and thin cream with a fat content of 12–15%. When separating whole milk in a centrifugal separator there is obtained a cream fraction with a fat content of about 40% and a skim-milk fraction with a fat content of ~0.05%. With the present-day supply of different types of cream with fat contents from 6% to 60% the word cream is no longer unambiguous and in the present patent application the expression cream product is used to cover the different variations in fat content.

With high temperature treatment one usually refers to a heating to a temperature above 110° C. during 2–10 seconds.

The microfiltration of the skim milk may be carried through in direct connection to the skimming, i.e. the separation of cream from the skim milk in a centrifugal separator. In such a case a part of the flow of cream which has left the centrifugal separator is used. This cream has a fat content of ~40%.

However, it is also possible to use a cream product with a lower fat content which after sterilization is mixed with the microfiltrated skim milk to give the desired fat content in the consumer milk. Such a cream product may be produced from the cream which is obtained during the skimming, the centrifugal separation, by mixing skim milk in the cream either in direct connection to the separation or in a later step.

If so is desired the cream product may be mixed with a portion of skim milk or microfiltrated skim-milk prior to the sterilization which portion is taken from the main flow of microfiltrated skim milk prior to the heat treatment step.

The permeate flow of skim milk may be subjected to a heat treatment to a temperature of 50–72° C. during up to 15 seconds. Such a treatment with an undefined combination of temperature and time is of value when a minimal influence on the constituents of the milk is desired. Such a low temperature treatment may be followed by a pasteurization of the milk at some later step.

Preferably the permeate flow of skim milk is subjected to any appropriate pasteurization process. Such pasteurization may involve heating the permeate flow to 70–85° C. for 2–30 seconds or high pasteurization, i.e. heating to 85–140° C. for 1–10 seconds. The desired degree of pasteurization is chosen depending on for example the legislation in different countries or on the purpose of the heat treatment i.e. to achieve a milk with as long a shelf life as possible or a milk with both good taste and good shelf life. The quality of the initial whole milk may of course also influence the choice of pasteurization level.

According to the invention the mixture of the portion of microfiltrated skim milk and cream product may suitably be brought to pass a homogenizer in order to achieve a desired amount of finely divided fat spheres.

The fat content of said mixture of cream product and skim milk is suitably below 25% during the homogenization.

The retentate flow from the microfilter may if so is desired be mixed with the partial flow of cream product and sterilized together with the same. The retentate flow may alternatively be taken care of in some other way.

The method according to the invention is described further with reference to FIG. 1 which shows a flow chart of an example of a method of producing pasteurized consumer milk. As is seen from this whole milk is heated prior to the centrifugal separation. A suitable temperature may be 55° C. The whole milk is divided into a flow of cream with a fat content of ~40% and a flow of skim milk with a fat content of ~0.05%. If so is desired a part of the skim milk may be returned immediately to the cream in order to give a cream product with a lower fat content. The obtained skim milk is led to a microfilter with a membrane with a pore size of 0.05–2.0μ, suitably 1.4μ and is divided into a bacteria poor permeate stream and a bacteria rich retentate stream. A part of the cream flow from the centrifugal separator is taken away and passes a high temperature treatment 120° C., 2 seconds. The retentate flow from the microfilter may if so is desired be mixed with the flow of cream prior to the high temperature treatment. Of 100 l whole milk the retentate flow constitutes 4,5 l according to this example. Alternatively, a partial flow of microfiltrated skim milk may be led away from the permeate flow and be mixed with cream prior to the high temperature treatment. The bacteria poor permeate flow is pasteurized, for example at 72° C. with a holding time of 15 seconds. A portion of the permeate flow which has passed the pasteurization is remixed with high temperature treated cream product and is led to a homogenizer. The amount of pasteurized, microfiltrated skim milk which is mixed with the cream product may be 0–35 l (counted on the initial amount 100 l). After homogenization of the cream-skim milk mixture said mixture is remixed with the pasteurized permeate flow of skim milk. After cooling the milk is packaged.

The milk which has been obtained according to the method of the invention has a good taste since no portion of the same has passed more than one heat treatment. The bacteria content is compared to milk which only has been pasteurized, more than 100 times lower, which means a considerably extended shelf life.

1 Whole milk
2 Preheating
3 Separation
4 Skim milk
5 Cream
6 Microfiltration
7 Permeate
8 Retentate
9 Pasteurization
10 High Temperature treatment
11 Homogenization
12 Cooling
13 Storage/Packaging

I claim:

1. A method for production of consumer milk with extended shelf-life, said method comprising the steps of:

separating whole milk into a fraction of cream and a fraction of skim milk, passing a flow of said fraction of skim milk through a microfilter to obtain a flow of retentate and a flow of permeate, treating a flow of said cream fraction at a high temperature of at least 110° C. for a predetermined time period sufficient to sterilize the cream fraction, remixing said high temperature-treated flow of cream with said permeate flow to form said consumer milk, and pasteurizing said permeate flow prior to remixing with the high temperature-treated cream flow, wherein the flow of separated cream and said permeate flow are subjected to not more than one high temperature treatment and not more than one pasteurizing step, respectively.

2. The method according to claim 1, wherein a cream product prior to the high temperature treatment is mixed with a portion of not yet heat treated microfiltrated skim milk.

3. The method according to claim 1, wherein a mixture of a cream product and permeate passes through a homogenizer.

4. The method according to claim 3, wherein the fat content of the cream-permeate mixture during the homogenization is below 18%.

5. The method according to claim 1, wherein the retentate flow from the microfilter is mixed with a partial flow of a cream product and passes the high temperature treatment together with the cream product.

* * * * *